United States Patent
Decaux

(10) Patent No.: US 8,409,430 B2
(45) Date of Patent: Apr. 2, 2013

(54) PURGING ASSEMBLY FOR A FILTER HOUSING

(75) Inventor: Daniel Henri Decaux, Blois (FR)

(73) Assignee: Delphi Technologies Holding S.arl, Troy, MI (US)

( * ) Notice: Subject to any disclaimer, the term of this patent is extended or adjusted under 35 U.S.C. 154(b) by 576 days.

(21) Appl. No.: 12/524,244

(22) PCT Filed: Jan. 31, 2008

(86) PCT No.: PCT/IB2008/050370
§ 371 (c)(1), (2), (4) Date: Feb. 4, 2010

(87) PCT Pub. No.: WO2008/093295
PCT Pub. Date: Aug. 7, 2008

(65) Prior Publication Data
US 2010/0258489 A1    Oct. 14, 2010

(30) Foreign Application Priority Data
Jan. 31, 2007  (GB) .................................. 0701839.3

(51) Int. Cl.
*B01D 35/14* (2006.01)
(52) U.S. Cl. .......................................... 210/86; 210/312
(58) Field of Classification Search .................. 210/85, 210/86, 104, 114, 143, 312, 313; 340/618, 340/620; 73/290
See application file for complete search history.

(56) References Cited

U.S. PATENT DOCUMENTS

| 6,702,160 | B1 | 3/2004 | Griffith |
| 6,881,328 | B2 * | 4/2005 | Dittmann et al. ............... 210/86 |
| 2002/0050469 | A1 | 5/2002 | Jokschas |
| 2005/0252847 | A1 | 11/2005 | Urbahn et al. |
| 2006/0070956 | A1 | 4/2006 | Herrmann et al. |
| 2010/0000916 | A1 | 1/2010 | Eberle et al. |

FOREIGN PATENT DOCUMENTS

| EP | 1172549 | 1/2002 |
| EP | 1277948 | 1/2003 |
| FR | 2882661 | 9/2006 |
| JP | 58170847 | 10/1983 |
| JP | 63-125169 | 8/1988 |
| JP | 2003-49733 | 2/2003 |
| WO | 95/13468 | 5/1995 |
| WO | 03/035217 | 5/2003 |
| WO | 2007/090379 | 8/2007 |

OTHER PUBLICATIONS

European Search Report dated Feb. 13, 2012.
Japan Office Action dated Aug. 26, 2011.
European Search Report dated Sep. 12, 2011.
European Search Report dated Sep. 1, 2010.
UK Search Report dated Mar. 19, 2007.
International Search Report dated Jun. 18, 2008.

* cited by examiner

*Primary Examiner* — Terry Cecil
(74) *Attorney, Agent, or Firm* — Mark H. Svoboda

(57) ABSTRACT

A purging assembly for a fuel filter housing. The purging assembly comprises a shaft having towards an upper end an upper sealing element, located around the perimeter of the shaft, and having towards a lower end a lower sealing element, located around the perimeter of the shaft. A sensor is integrated with the shaft.

7 Claims, 2 Drawing Sheets

PURGING ASSEMBLY FOR A FILTER HOUSING

BACKGROUND

The present invention relates to a purging assembly comprising an integral sensor for use with a filter housing. In particular, the present invention relates to a purging assembly for a fuel filter housing, wherein the integral sensor is used to detect the accumulation of a pre-determined amount of impurities in the housing, in order to provide an indication that the impurities should be purged from the housing, or the integral sensor is used to provide information relating to the state of the fuel, for example its temperature or pressure.

FIELD OF THE INVENTION

The primary purpose of fuel filters is to separate impurities out from a fuel. These impurities, such as water and particulate matter are collected within the filter housing and when they have built up to a particular level it is necessary to remove them so that the efficiency of the filter is not reduced. This is done using a purging assembly. Conventionally, to determine if the filter housing should be purged a visual check of the filter housing needs to be carried out and such a check may be difficult if the housing is not easily accessible. Also, such checks may be overlooked.

BACKGROUND OF THE INVENTION

Consequently, there is a need for a device which will automatically indicate when it is necessary to purge impurities from the fuel filter housing.

Fuel filter housings also act as a fuel reservoir and hence provide an ideal location at which the state of the fuel can be monitored.

According to a first aspect the present invention provides a purging assembly for a fuel filter housing, the purging assembly comprising a shaft having towards an upper end an upper sealing element located around the perimeter of the shaft, and having towards a lower end a lower sealing element located around the perimeter of the shaft, wherein a sensor is integrated within the shaft.

According to a first preferred embodiment of the present invention the sensor is a water sensor integrated with the shaft at a point between the upper sealing element and the lower sealing element. The water sensor is integrated between the upper and lower sealing elements as this is where any water separated from the fuel by the filter collects in the filter housing. By selecting the position of the water sensor along the shaft the amount of water that can be collected in the housing prior to being detected can be pre-determined. In alternative embodiments of the present invention the sensor may be of a different type. For example, the sensor may detect clogging of the filter or it may be used to measure the temperature or pressure of the fuel within the filter.

Preferably, the integral water sensor is electrically connectable to an electronic control unit.

Preferably, an electrical connector is provided on a head at an upper end of the shaft. In use, the electrical connector electrically connects the sensor to an electronic control unit. Alternatively, the connector may be located remotely to the head and may be connected to the purging assembly by wires. This may be advantageous if the space in which the purging assembly and filter housing are located is small.

Preferably, a weak point is provided between the head and the shaft. This enables the head to be sheared from the purging assembly in the case of a collision in order to prevent damage to the filter housing.

Preferably, the shaft is provided with a retention device which maintains its external diameter when a force is applied to it along the longitudinal axis of the shaft in a direction from the upper sealing element to the lower sealing element and which reduces in external diameter when a force is applied to it in the opposite direction.

Preferably, the shaft is provided with a first engagement portion, for engagement of the purging assembly with the filter housing.

Preferably, the first engagement portion is the male portion of a bayonet-type fixing. Alternatively, the first engagement portion may be a helical screw thread or any other suitable form of engagement means.

According to a second aspect the present invention provides a combination of a filter housing and a purging assembly, wherein, in use, the first engagement portion on the shaft is engaged with a second engagement portion provided on the filter housing, such that the upper sealing element engages with an orifice in the filter housing which is otherwise open to atmosphere and the lower sealing element engages with an orifice in the filter housing which is otherwise open to drain.

BRIEF DESCRIPTION OF THE DRAWINGS

A preferred embodiment of the present invention will now be described with reference to the accompanying drawings in which.

Figure 1:
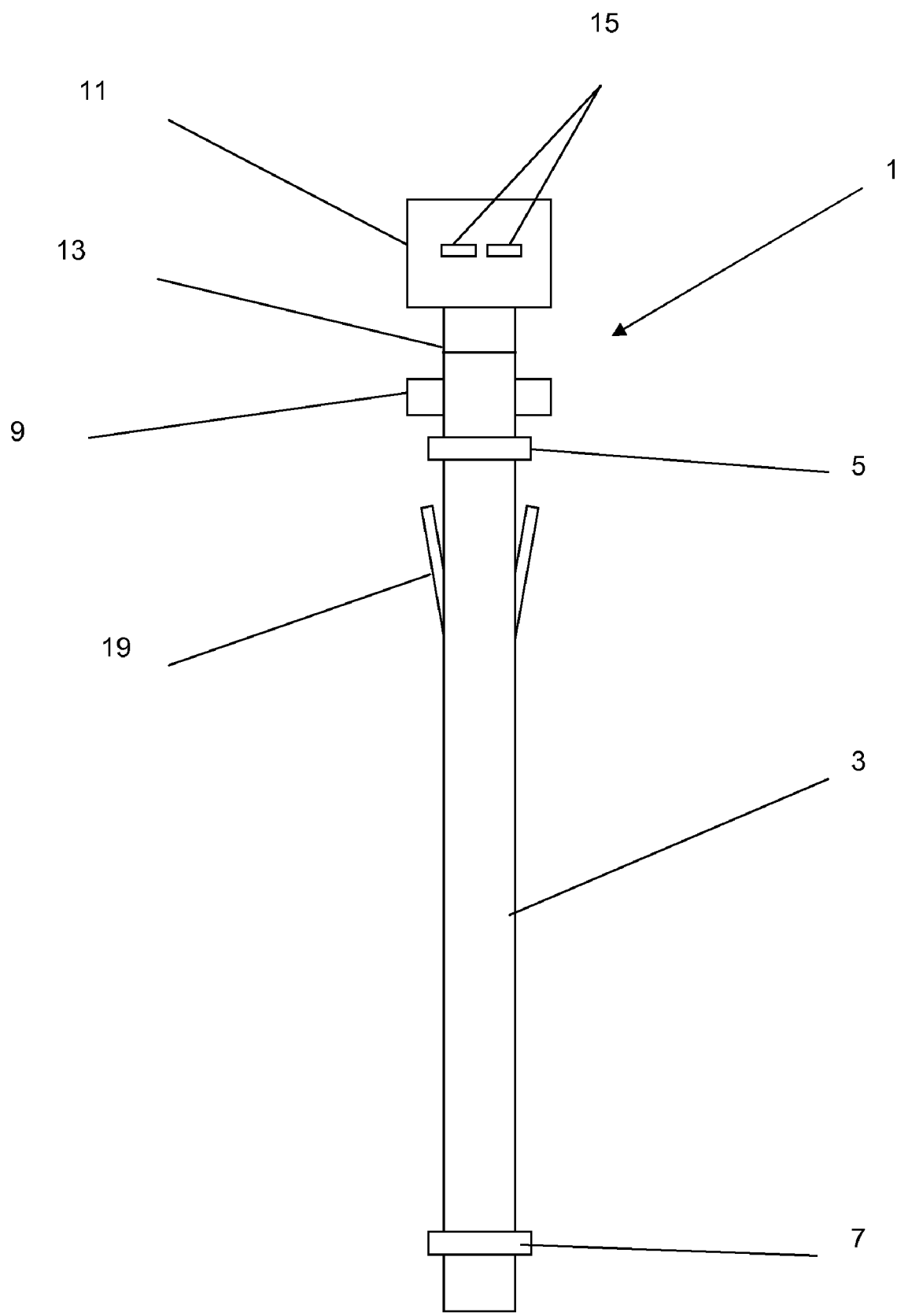
FIG. 1 is a schematic view of a purging assembly according to the present invention.
Figure 2:
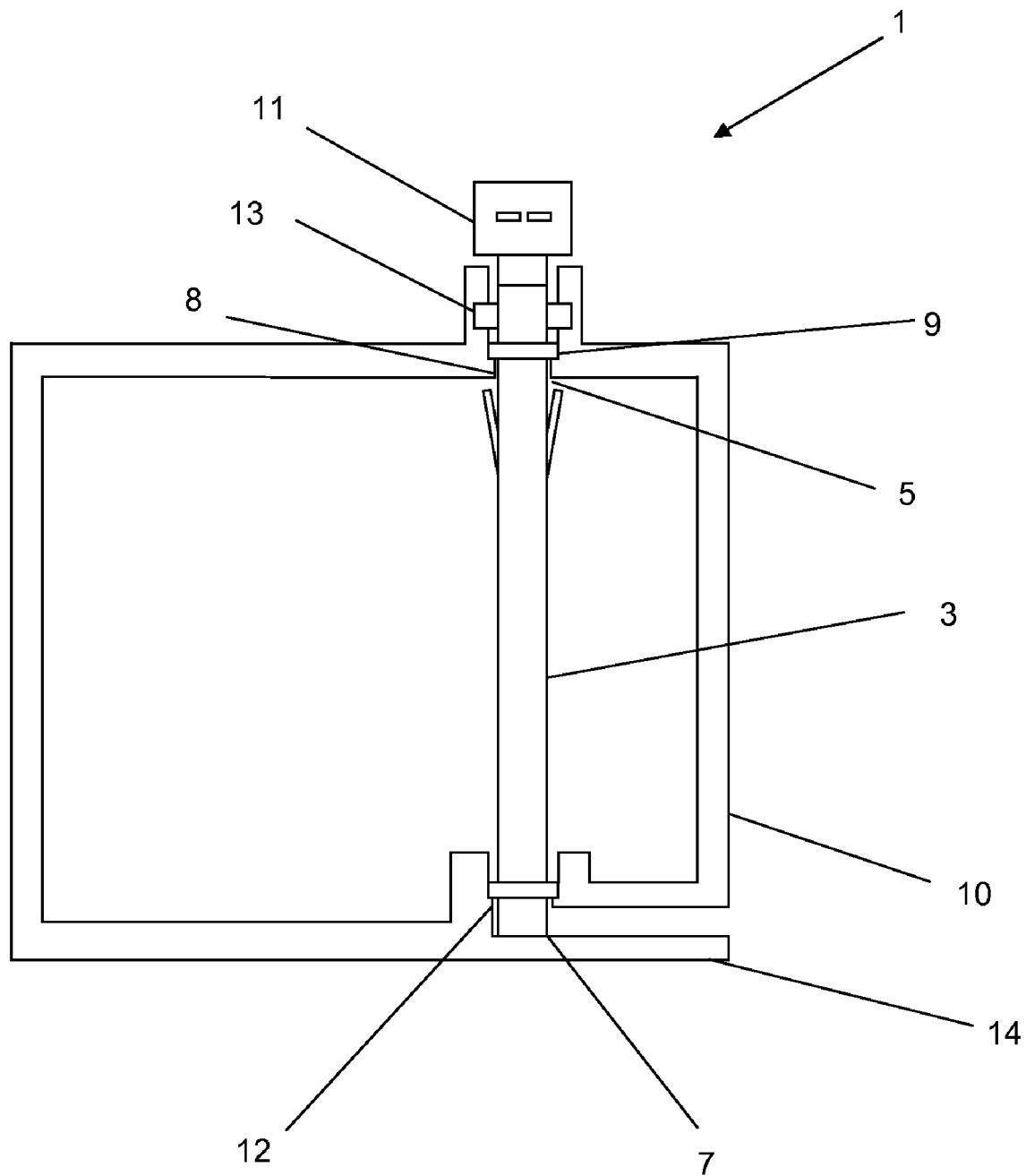
FIG. 2 is a schematic view of a purging assembly fitted, in a closed position, to a filter housing according to the present invention.

The purging assembly 1, as illustrated in FIGS. 1 and 2, comprises a shaft 3 having an upper O-ring seal 5 for sealing with a first orifice 8 provided in a filter housing 10, as shown in FIG. 2. The first orifice 8 is open to atmosphere. The shaft has a lower O-ring seal 7 for sealing with a second orifice 12 which is open to a drain 14, see FIG. 2.

Above the upper seal 5 the purging assembly 1 is provided with a bayonet fixing 9 for engagement with the filter housing 10 to fix the purging assembly in a closed position. Above the bayonet fixing 9 the purging assembly 1 is provided with a head 11 and between the bayonet fixing 9 and the head a weak point 13 is provided, which provides a point at which the head 11 will shear from the shaft 3, should the head 11 be struck, for example, if the vehicle is involved in a collision.

The head 11 comprises an electrical connector 15, typically of 2 pin or 3 pin type, for connection to the electronic control unit of a vehicle. This connector 15 is electrically connected to a water sensor (not shown).

Between the upper seal 5 and the lower seal 7 the shaft 3 is also provided with a device 19 to prevent removal of the purging assembly 1 from the filter housing 10. The device 19 is configured so that it can readily pass into the filter housing 10 through the orifice 8 but cannot then readily be removed from the filter housing 10. In a normal position the device 19 has a diameter that is greater than that of the orifice 8. However, if it is necessary to withdraw the purging assembly 1 from the filter housing 10 the device 19 can be manipulated so that its diameter is reduced enabling it to pass through the orifice 8.

In use, the purging assembly 1 is located in the filter housing 10 and secured in place by engagement of the bayonet fixing 9 with a complementary fixing part on the filter housing 10. The upper seal 5 provides a seal between the orifice 8 which is open to atmosphere and the lower seal 7 provides a seal with the orifice 12 which is open to a drain 14. When in this position fuel within the filter housing 10 cannot escape via either orifice.

Any water present in the fuel will collect at the bottom of the filter housing 10. After a period of time the collected water will reach the level of the water sensor. An electrical signal will then be sent to the ECU which will translate this into an audible and/or visible warning. For example, for display on the dashboard of a vehicle. Upon this warning being received it is known that the water should be emptied from the filter housing 10.

To do this the bayonet fixing 9 is disengaged from the filter housing 10 and the purging assembly 1 is drawn away from the filter housing 10 such that the upper seal 5 no longer seals with the orifice 8 and the lower seal 7 no longer seals with the orifice 12 that is open to the drain 14. This enables the water to drain from the filter housing 10.

When all the water has been drained from the filter housing 10 the bayonet fixing 9 can be re-engaged with the filter housing 10 such that the upper seal 5 seals with the orifice 8 and the lower seal 7 seals with the orifice 12.

The water sensor is positioned on the shaft 3 at the height of the maximum allowable collection of water within the filter housing 10.

The invention claimed is:

1. A purging assembly for a fuel filter housing, the purging assembly comprising a shaft having towards an upper end an upper sealing element located around the perimeter of the shaft and having towards a lower end a lower sealing element located around the perimeter of the shaft, wherein the lower sealing element is configured to sealingly engage with an orifice in the filter housing which is otherwise open to drain, wherein a sensor is integrated with the shaft, wherein an electrical connector is provided on a head at an upper end of the shaft, wherein the electrical connector is configured to electrically connect the sensor to an electronic control unit, wherein a weak point is provided between the head and the shaft, said weak point sufficiently weak to allow the head to separate from the shaft before the filter housing is damaged in the event of the head being struck.

2. A purging assembly as claimed in claim 1, wherein the sensor is a water sensor integrated with the shaft at a point between the upper sealing element and the lower sealing element.

3. A purging assembly as claimed in claim 2, wherein the integral water sensor is connectable to an electronic control unit.

4. A purging assembly as claimed in claim 1, wherein the shaft is provided with a retention device which maintains its external diameter when a force is applied to it along the longitudinal axis of the shaft in a direction from the upper sealing element to the lower sealing element and which reduces in external diameter when a force is applied to it in the opposite direction.

5. A purging assembly as claimed in claim 1, wherein the shaft is provided with a first engagement portion for engagement of the purging assembly with the filter housing.

6. A purging assembly as claimed in claim 5, wherein the first engagement portion is the male portion of a bayonet-type fixing.

7. A combination of a filter housing and a purging assembly as claimed in claim 5, wherein a first engagement portion on the shaft is engagable with a second engagement portion provided on the filter housing, such that when the first engagement portion on the shaft is engaged with the second engagement portion provided on the filter housing the upper sealing element sealingly engages with an orifice in the filter housing which is otherwise open to atmosphere and the lower sealing element sealingly engages with an orifice in the filter housing which is otherwise open to drain.

* * * * *